United States Patent
Boulanger

(10) Patent No.: US 10,704,712 B1
(45) Date of Patent: Jul. 7, 2020

(54) EXTERNAL PRESSURE CX GASKET

(71) Applicant: Cameron International Corporation, Houston, TX (US)

(72) Inventor: Bruce Boulanger, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 14/973,407

(22) Filed: Dec. 17, 2015

(51) Int. Cl.
| | |
|---|---|
| *F16L 17/08* | (2006.01) |
| *F16J 15/08* | (2006.01) |
| *F16L 23/20* | (2006.01) |
| *F16J 15/06* | (2006.01) |
| *E21B 33/00* | (2006.01) |
| *F16J 15/02* | (2006.01) |
| *F16J 15/10* | (2006.01) |

(52) U.S. Cl.
CPC .............. *F16L 17/08* (2013.01); *F16J 15/08* (2013.01); *F16J 15/0887* (2013.01); *F16L 23/20* (2013.01); *E21B 2033/005* (2013.01); *F16J 15/022* (2013.01); *F16J 15/062* (2013.01); *F16J 15/104* (2013.01)

(58) Field of Classification Search
CPC ..... F16L 23/20; F16L 17/08; E21B 2033/005; F16J 15/08; F16J 15/0887
See application file for complete search history.

(56) References Cited

U.S. PATENT DOCUMENTS

| | | | | |
|---|---|---|---|---|
| 2,900,199 A | * | 8/1959 | Logan | F16L 23/18 277/614 |
| 3,141,685 A | * | 7/1964 | Watts | F16L 17/063 285/93 |
| 3,339,948 A | * | 9/1967 | Weitzel | F16L 21/022 277/608 |
| 3,507,506 A | * | 4/1970 | Tillman | F16L 23/20 277/614 |
| 4,019,371 A | * | 4/1977 | Chaplin | G01M 3/2861 73/46 |
| 4,361,331 A | * | 11/1982 | Kohler | F16J 15/0887 277/314 |
| 4,470,609 A | * | 9/1984 | Poe | F16L 23/08 277/623 |
| 4,494,762 A | * | 1/1985 | Geipel | F16L 23/20 277/614 |
| 4,537,406 A | * | 8/1985 | Hirasuna | E21B 17/0423 277/314 |
| 5,039,140 A | * | 8/1991 | Szymczak | E21B 33/03 285/334.2 |

(Continued)

*Primary Examiner* — Nicholas L Foster
(74) *Attorney, Agent, or Firm* — Helene Raybaud

(57) ABSTRACT

A pressure-energized ring joint gasket such as a CX gasket for a clamp or other connector includes a cylindrical inner surface oriented toward adjacent sections of a subsea stack that are to be joined by the connector, wings that taper away from the cylindrical inner surface and end in a rectangular shoulder, wherein a portion of the rectangular shoulder is removed to create a boss, an upper groove, and a lower groove, and D-rings in the upper and lower grooves. The gasket can be used to connect adjacent sections of the stack and to maintain a seal between the sections whether the external sea water pressure is greater or less than the internal well pressure. A method for using the gasket for connecting adjacent sections of a subsea stack in offshore drilling environments is also provided.

8 Claims, 4 Drawing Sheets

(56) References Cited

U.S. PATENT DOCUMENTS

| | | | |
|---|---|---|---|
| 5,103,915 A * | 4/1992 | Sweeney | E21B 33/03 166/379 |
| 5,135,266 A * | 8/1992 | Bridges | E21B 33/0422 285/123.12 |
| 5,174,615 A * | 12/1992 | Foster | F16L 23/16 285/334.2 |
| 5,755,287 A * | 5/1998 | Cain | E21B 33/038 166/368 |
| 5,839,765 A * | 11/1998 | Carter | F16L 23/18 277/603 |
| 5,941,530 A * | 8/1999 | Williams | E21B 33/035 277/322 |
| 5,944,319 A * | 8/1999 | Kohlman | F16L 23/16 277/314 |
| 6,237,968 B1 * | 5/2001 | Bohnes | F16L 19/0283 285/334.2 |
| 6,325,390 B1 * | 12/2001 | Sillmon | F16L 23/003 277/614 |
| 6,450,507 B2 * | 9/2002 | Johnson | F16L 25/0018 277/612 |
| 6,722,426 B2 * | 4/2004 | Sweeney | F16J 15/0887 166/115 |
| 6,932,355 B1 * | 8/2005 | Hjertholm | F16L 23/18 277/614 |
| 7,025,360 B2 * | 4/2006 | Walker | E21B 33/03 277/652 |
| 7,107,662 B1 * | 9/2006 | Levario | F16L 23/125 277/608 |
| 7,819,439 B2 * | 10/2010 | Paton | E21B 17/02 277/314 |
| 8,096,560 B2 * | 1/2012 | Pallini, Jr. | E21B 33/038 277/339 |
| 8,226,089 B2 * | 7/2012 | Pallini, Jr. | E21B 17/04 277/339 |
| 9,103,457 B2 * | 8/2015 | Holliday | F16J 15/002 |
| 9,121,350 B2 * | 9/2015 | Taylor | F16J 15/062 |
| 9,206,665 B2 * | 12/2015 | Gerrard | E21B 33/10 |
| 9,488,302 B2 * | 11/2016 | Gjerstad | E21B 33/043 |
| 9,534,689 B2 * | 1/2017 | Chen | E21B 33/035 |
| 2001/0045711 A1 * | 11/2001 | Johnson | F16L 25/0018 277/608 |
| 2003/0000694 A1 * | 1/2003 | Sweeney | F16J 15/0887 166/115 |
| 2004/0056432 A1 * | 3/2004 | Walker | E21B 33/03 277/627 |
| 2007/0013146 A1 * | 1/2007 | Gariepy | F16L 17/06 277/608 |
| 2008/0048443 A1 * | 2/2008 | Paton | E21B 17/02 285/333 |
| 2009/0102132 A1 * | 4/2009 | Holliday | E21B 33/035 277/324 |
| 2010/0019456 A1 * | 1/2010 | Gerrard | E21B 33/10 277/336 |
| 2010/0276895 A1 * | 11/2010 | Taylor | F16J 15/062 277/608 |
| 2013/0020769 A1 * | 1/2013 | Ueki | C08K 3/04 277/345 |
| 2013/0285369 A1 * | 10/2013 | Gjerstad | E21B 33/043 285/119 |

* cited by examiner

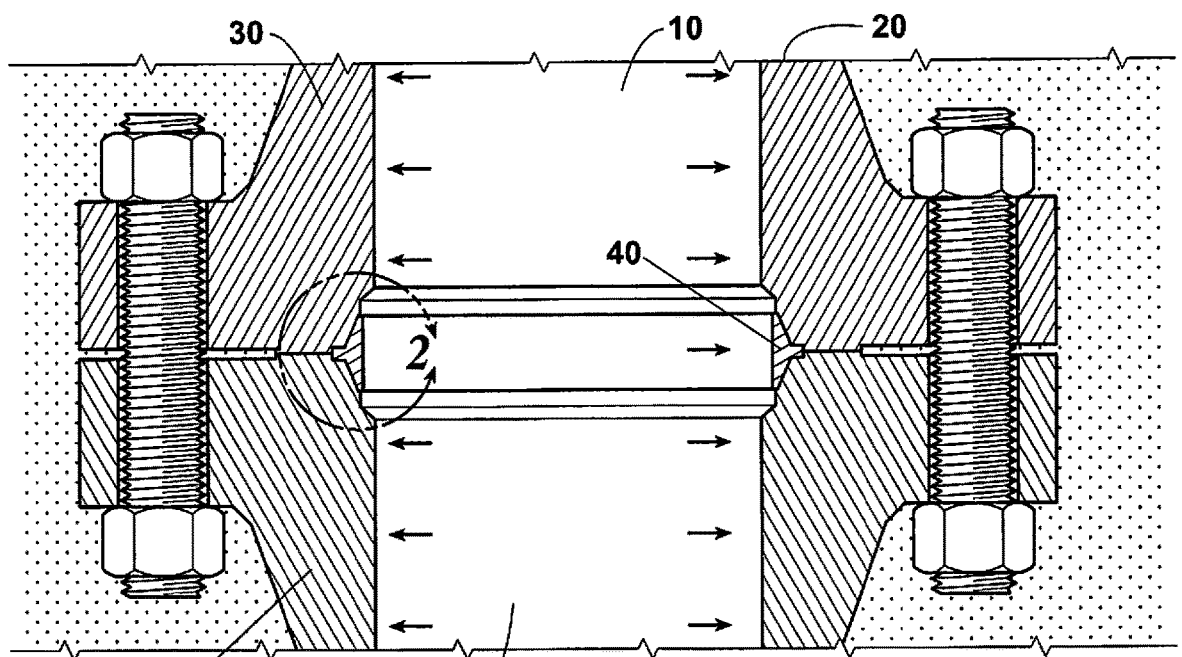
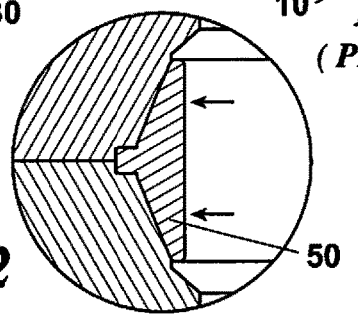
Fig. 2
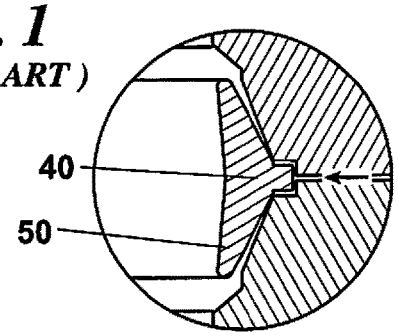
Fig. 4
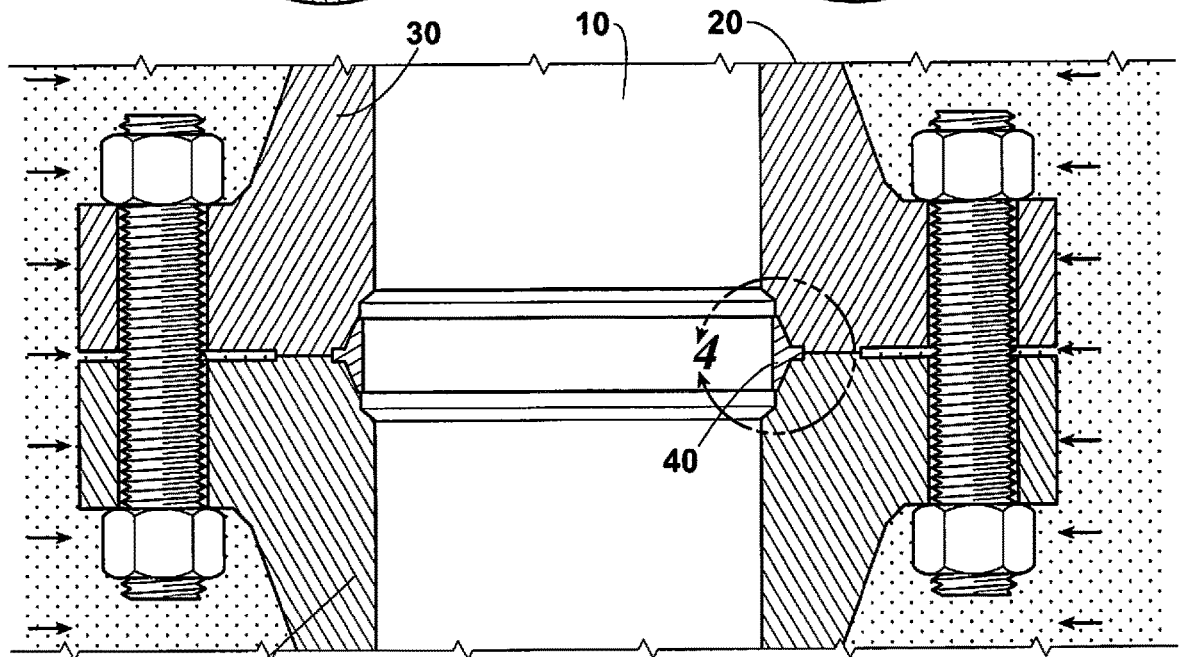
Fig. 3 (PRIOR ART)

EXTERNAL PRESSURE CX GASKET

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

This disclosure relates to apparatuses and methods for connecting sections of a subsea stack in offshore drilling environments. More specifically, the disclosure relates to pressure-energized ring joint gaskets such as a CX-type gasket that maintains its seal between stack sections during unbalanced drilling conditions such as when the external sea water pressure is greater or less than the internal well pressure.

CX gaskets are generally frustoconical in shape, with the cylindrical inner surface oriented toward the stack sections. The CX gasket also has wings that gradually taper away from the cylindrical inner surface and end in a rectangular shoulder. The outer surface of the CX gasket is metal, which helps to insure the integrity of the seal against the metal sections of the stack and that the sections can be disconnected when necessary for operational safety. The remainder of the gasket may be comprised of metal, plastic, or other materials that are known in the art.

FIG. 1 and FIG. 2 show, in cross-section, two sections 10 of a subsea stack joined by a clamp 20, the clamp 20 having two hubs 30, and a CX gasket 40. The internal well pressure is greater than the external sea water pressure. As a result, the wings 50 of the CX gasket 40 are forced against the hubs 30 of the clamp 20, which increases the metal-to-metal contact of the CX gasket 40. There is no deformation of the CX gasket 40 and the seal between the CX gasket 40 and the stack sections 10 remains intact.

In comparison, FIG. 3 and FIG. 4 show, in cross-section, two sections 10 of the stack joined by a clamp 20 when the internal well pressure is less than the external sea water pressure. In this case, the external sea water pressure causes the wings 50 of the CX gasket 40 to deflect inwardly away from the hubs 30 of the clamp 20. This decreases the metal-to-metal contact of the CX gasket, breaks the seal between the metal sections 10 of the stack, and creates a leak path which, depending on the relative internal well pressure and external sea water pressure, may allow sea water to leak into the well bore or well bore fluids to leak into the surrounding environment.

There is a need for a CX gasket 40 for a clamp 20 or other connector that does not change shape and maintains its seal whether the internal well pressure is greater or less than the external sea water pressure.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

A pressure-energized ring joint gasket such as a CX-type gasket for use in a clamp or other connector includes a cylindrical inner surface oriented toward sections of the subsea stack that are to be joined by the connector, wings that taper away from the cylindrical inner surface and end in a rectangular shoulder, wherein a portion of the rectangular shoulder is removed to create a boss, an upper groove, and a lower groove, and a D-ring in each of the upper and lower grooves. When the external sea water pressure is greater than the internal well pressure, the D-seals 90 prevent external sea water pressure from passing the boss 80 and causing the wings 70 of the CX gasket 60 to bow inward toward the well bore, which would permanently deform the wings 70 and create a leak path.

A method for preventing formation of a leak path when external sea water pressure is greater than internal well pressure includes using embodiments of a pressure-energized ring joint gasket of this disclosure to create a seal between two adjacent sections of a subsea stack

BRIEF DESCRIPTION OF THE DRAWINGS

The subject disclosure is further described in the following detailed description, and the accompanying drawing and schematic of non-limiting embodiment of the subject disclosure. The features depicted in the figure are not necessarily shown to scale. Certain features of the embodiments may be shown exaggerated in scale or in somewhat schematic form, and some details of elements may not be shown in the interest of clarity and conciseness.

FIG. 1 is a cross-sectional view showing the operation of a conventional CX gasket when the internal well pressure is greater than the external sea water pressure;

FIG. 2 is an expanded view of the circled area of FIG. 1;

FIG. 3 is a cross-sectional view showing the operation of a conventional CX gasket when the internal well pressure is less than the external sea water pressure;

FIG. 4 is an expanded view of the circled area of FIG. 3;

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 5:
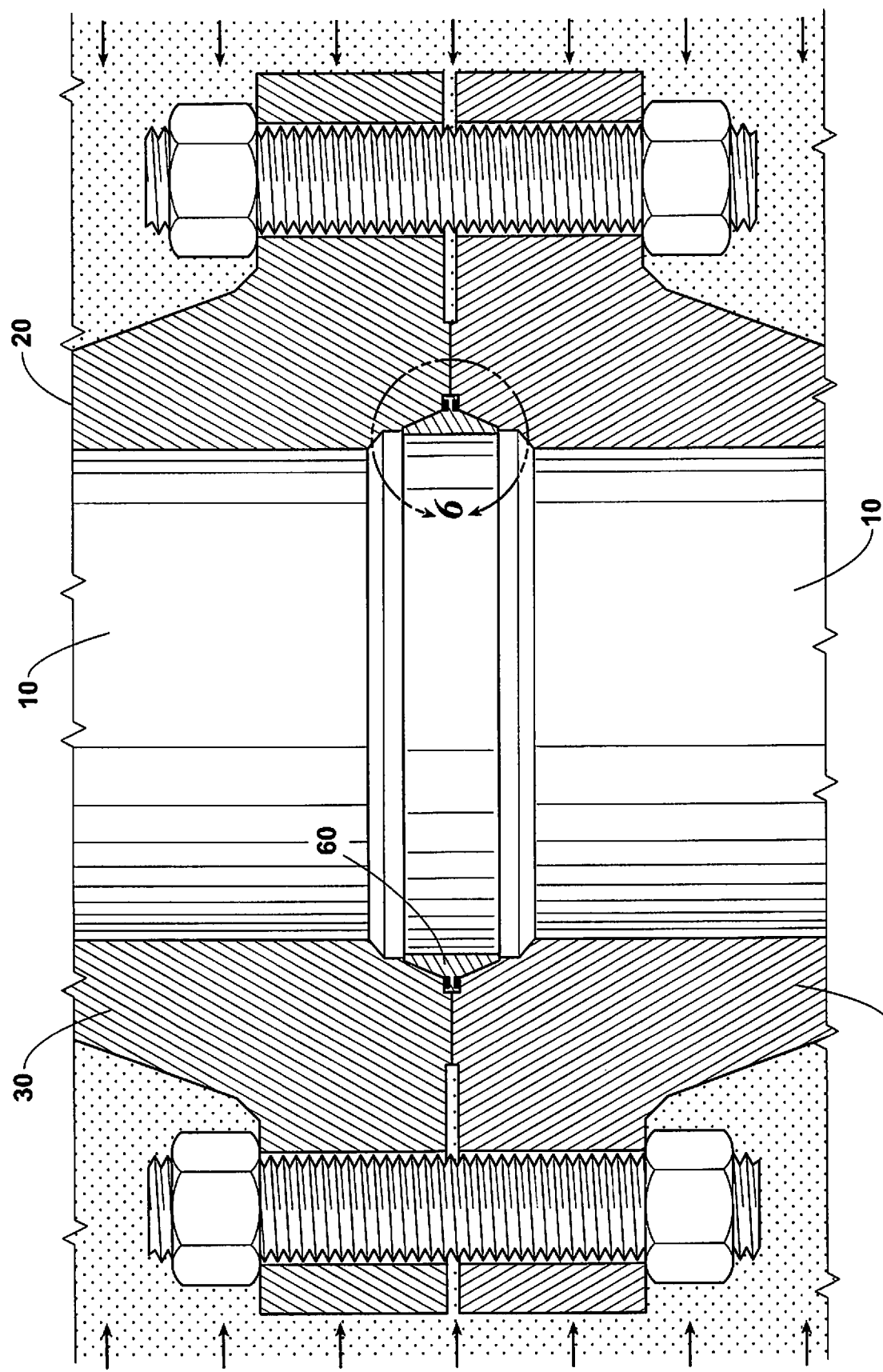
FIG. 5 is a cross-sectional view showing the operation of an embodiment when the internal well pressure is less than the external sea water pressure.
Figure 7:
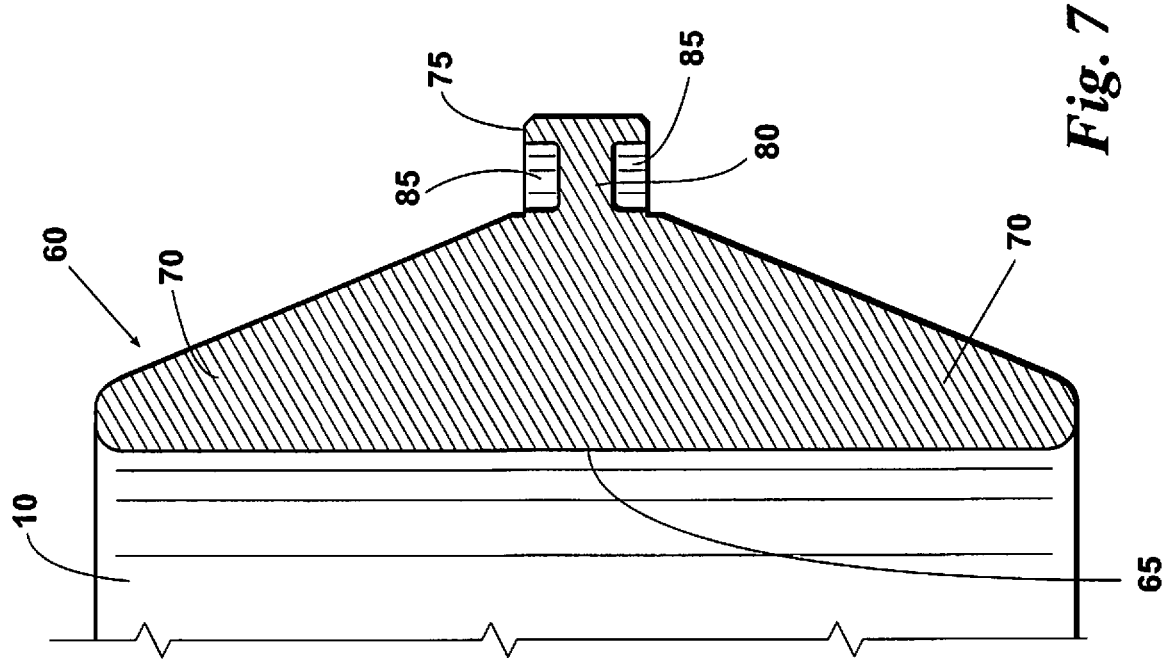
FIG. 7 is a cross-sectional view of an embodiment, including the shoulder, boss, and D-seals of the CX gasket.
Figure 6:
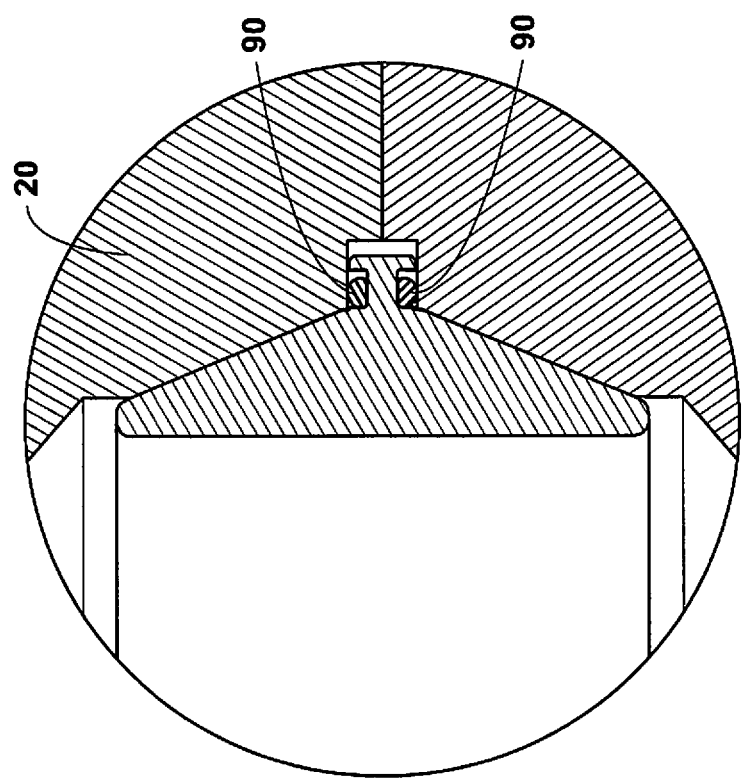
FIG. 6 is an expanded view of the circled area of FIG. 5.

The disclosure is a pressure-energized ring joint gasket such as a CX gasket 60 for a clamp 20 or other connector that does not change shape and maintains its seal whether the internal well pressure is greater or less than the external sea water pressure. FIGS. 5-7 show, in cross-section, the clamp 20 used to join two sections 10 of a subsea stack and an embodiment of the CX gasket 60. The CX gasket 60 is frustoconical in shape, with the cylindrical inner surface 65 oriented toward the stack sections 10. The wings 70 of the CX gasket 60 gradually taper away from the cylindrical inner surface 65 and end in a rectangular shoulder 75 that fit within corresponding cut-outs on the clamp 20.

The outer surface of the CX gasket 60 is metal, which helps to insure the integrity of the seal against the sections 10 of the stack and that the sections 10 can be disconnected when necessary for operational safety. The remainder of the CX gasket 60 may be comprised of metal, plastic, or other materials that are known in the art. As an example, the CX gasket 60 may be made of stainless steel, e.g., stainless steel 316, and coated or plated with silver.

Part of the rectangular shoulder 75 between the wings 70 and the top of the CX gasket 60 is removed, creating a boss 80 that has a smaller diameter than the shoulder 75 and upper and lower grooves 85. One D-seal 90 is placed in each groove. The D-seal 90 may be a face seal with an internal diameter of 21.548 inches, an outer diameter of 21.922 inches, and a height of 0.182 inches. The D-seal 90 is made of rubber or other polymers that are known in the art. In some embodiments, the D-seal 90 is nitrile rubber with a hardness of 90 durometers.

When the external sea water pressure is greater than the internal well pressure, the D-seals 90 prevent external sea water pressure from passing the boss 80 and causing the wings 70 of the CX gasket 60 to bow inwardly toward the well bore. Such deformation, if it occurred, would produce a leak path and allow sea water to leak into the well bore. In addition, since the deformation would be permanent once it occurred, well bore fluids could also leak from the blowout preventer or BOPs whenever the internal well pressure was greater than the external sea water pressure. However, because of the D-seals 90, the pressure acting on the wings 70 of the CX gasket 60 is the internal well pressure. As a result, the wings 70 of the CX gasket 60 are forced against the flanges 30 of the clamp 20, thereby maintaining the integrity of the seal around the sections 10 of the stack and preventing the formation of a leak path.

Figure 8:
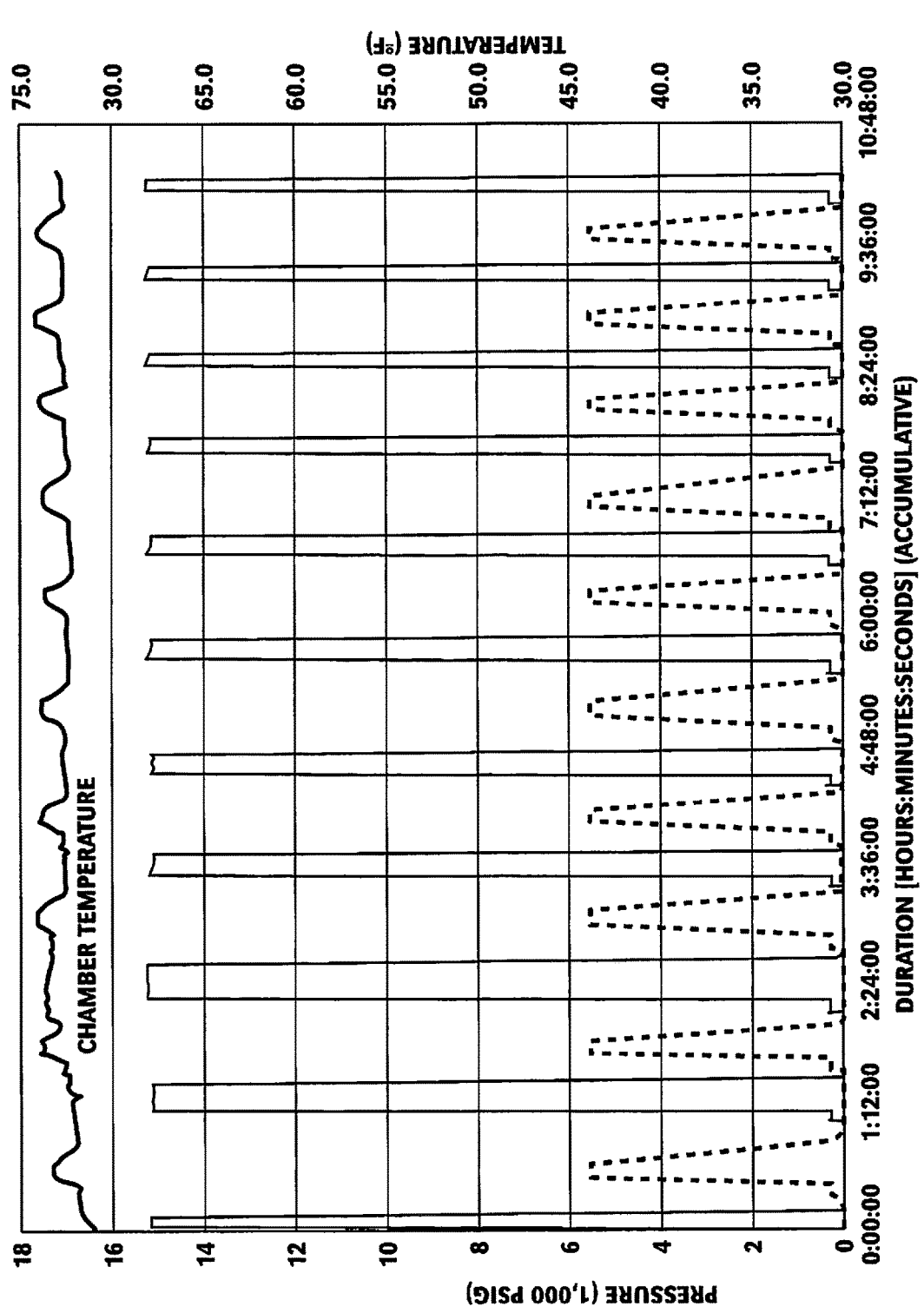
FIG. 8 is a graph showing the results of analytical tests to determine the external pressure capability of the CX gasket.

Tests were conducted to determine the external pressure capability of the CX gasket up to a water depth of 12,000 feet (approximately 5,500 pounds per square inch ("psi")). In particular, two 18¾" 15M CX-18 blind flanges were bolted together with a CX-18 external pressure gasket. The procedure involved both internal and external pressure testing of the ring gaskets, as well as nine repetitions of the initial tests. The sealing performance of the CX-18 external pressure gasket is shown in FIG. 8, which indicates that the gasket can withstand at least 5,500 psi pressure when applied externally and 15,000 psi pressure when applied internally (well bore).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for" or "step for" performing a function, it is intended that such elements are to be interpreted under 35 U.S.C. 112(f). However, for any claims containing elements designated in any other manner, it is intended that such elements are not to be interpreted under 35 U.S.C. 112(f).

What is claimed:

1. A pressure-energizable ring shaped gasket for installation between two members, the gasket comprising:
    a cylindrical inner surface;
    wings that define outer surfaces that extend from respective ends of said gasket to a location proximate to a rectangular shoulder, wherein substantially all of said outer surfaces of said wings are frusto conical, said outer surfaces taper away from the cylindrical inner surface and end at the rectangular shoulder, said outer surfaces of said wings each define a sealing surface from said respective end of said gasket, said outer surfaces do not contain a groove, wherein a portion of the rectangular shoulder includes a boss, an upper groove defining a first flat surface, a lower groove defining a second flat surface, an upper sealing surface, and a lower sealing surface, and wherein said boss does not include an outward radially facing groove; and
    an upper seal ring that defines a third flat surface in the upper groove and a lower seal ring that defines a fourth flat surface in said lower groove, the upper seal ring and the lower seal ring being D-shaped in cross-section prior to placement in their respective groove of said upper groove and said lower groove, wherein said third flat surface of said upper seal ring contacts said first flat surface of said upper groove, and wherein said fourth flat surface of said lower seal ring contacts said second flat surface of said lower groove; and
    said upper seal ring and said lower seal ring are configured to remain in their respective groove when an external sea pressure acting on the gasket is greater than an internal well pressure acting on the gasket;
    wherein said first flat surface of said upper groove is radially wider than said third flat surface of said upper seal ring; and said second flat surface of said lower groove is radially wider than said fourth flat surface of said lower seal ring.

2. The gasket according to claim 1, wherein the seal rings are comprised of nitrile rubber.

3. The gasket according to claim 2, wherein the nitrile rubber has a hardness of about 90 durometers.

4. A pressure-energizable ring shaped gasket for use in a joint, the gasket being frusto-conical shaped and comprising:
    a shoulder defining a boss located on an external pressure-facing side of the gasket an upper groove defining a first flat surface, a lower groove defining a second flat surface, wherein said boss does not include an outward radially facing groove;
    an upper and a lower seal ring located on the boss;
    said shoulder defining an upper sealing surface adjacent said upper seal ring and a lower sealing surface adjacent said lower seal ring;
    said upper seal ring and said lower seal ring being D-shaped in cross-section prior to placement on the boss, said upper seal ring defining a third flat surface and said lower seal ring defining a fourth flat surface;
    a cylindrical-shaped internal side of the gasket;

wherein said external pressure-facing side defines wings that taper away from the cylindrical-shaped internal side and toward the boss, said wings each defining an outer surface that defines a frusto-conical sealing surface from respective ends of said gasket to a location proximate said boss and said outer surfaces do not contain a groove; and wherein said first flat surface of said upper groove is radially wider than said third flat surface of said upper seal ring, and said second flat surface of said lower groove is radially wider than said fourth flat surface of said lower seal ring.

5. The gasket according to claim 4 wherein the upper and lower seal rings have a hardness of about 90 durometers.

6. The gasket according to claim 4, the boss including an upper groove and a lower groove, wherein the upper and lower seal rings are configured to remain in the upper and lower grooves, respectively, when an external sea pressure acting on the gasket is greater than an internal well pressure acting on the gasket.

7. A pressure-energizable ring shaped gasket for use in a joint, and the gasket comprising:
a cylindrical inner surface;
wings that taper away from the cylindrical inner surface and end in a location proximate a rectangular shoulder, a portion of the rectangular shoulder including a boss, an upper groove, and a lower groove, said upper groove defining a first flat surface, said lower groove defining a second flat surface, said wings each defining an outer surface that defines a frusto-conical sealing surface from respective ends of said gasket to said boss wherein said boss does not include an outward radial facing groove; and
an upper seal ring in the upper groove, the upper seal ring being D-shaped in cross-section prior to placement in said upper groove, said upper seal ring defining a third flat surface wherein said first flat surface of said upper groove is radially wider than said third flat surface of said upper seal ring;
a lower seal ring in the lower groove, the lower seal ring being D-shaped in cross-section prior to placement in said lower groove, said lower seal ring defining a fourth flat surface wherein second said flat surface of said lower groove is radially wider than said fourth flat surface of said lower seal ring;
said rectangular shoulder defining sealing surfaces adjacent said seal rings;
the frusto-conical outer surfaces of said wings are configured to be a seal when an internal pressure is greater than an external pressure, the seal rings each are configured to be a seal when the external pressure is greater than an internal pressure, wherein the seal rings are configured to remain in the respective groove of said upper groove and said lower groove, and wherein said outer surfaces do not contain a groove.

8. A pressure energized joint gasket and connector assembly comprising:
an upper clamp member defining an upper clamp inner surface for surrounding a stack section, said upper clamp inner surface defining an upper clamp tapered portion, said upper clamp member defining an upper clamp lower surface defining an inside edge and an upper clamp cutout, said upper clamp cutout adjacent said upper clamp lower surface and said upper clamp tapered portion;
a lower clamp member defining a lower clamp inner surface for surrounding a stack section, said lower clamp inner surface defining a lower clamp tapered portion, said lower clamp member defining a lower clamp upper surface defining an inside edge, said lower clamp upper surface adjacent to said upper clamp lower surface, said lower clamp upper surface defining a lower clamp cut-out, said lower clamp cut-out adjacent said lower clamp upper surface and said lower clamp tapered portion;

an annular receiving area defined by said upper clamp cut-out and said lower clamp cut-out;

a ring joint gasket defining a cylindrical inner surface, an upper wing ending in an upper edge and a lower wing ending in a lower edge, an outer surface defining an upper frusto-conical tapered surface on said upper wing, a lower frusto-conical tapered surface on said lower wing, said outer surface further defining a protruding shoulder, said upper tapered surface extending from said upper edge to said protruding shoulder, a lower frusto-conical tapered surface extending from said lower edge to a location proximate said protruding shoulder, said protruding shoulder having a boss having an upper groove defining a first flat surface, a lower groove defining a second flat surface, an upper sealing surface and a lower sealing surface, an outer section of said protruding shoulder defining an upper corner and a lower corner, said protruding shoulder connected to said outer surface of said ring joint gasket by said boss, wherein said outer surface of said ring joint gasket, said boss and said outer section of said protruding shoulder define an upper groove and a lower groove;

said protruding shoulder of said ring joint gasket received in said annular receiving area defined by said upper clamp member and said lower clamp member;

said upper frusto-conical tapered surface of said ring joint gasket contacting said upper clamp tapered portion of said upper clamp inner surface of said upper clamp member;

said lower frusto-conical tapered surface of said ring joint gasket contacting said lower clamp tapered portion of said lower clamp inner surface of said lower clamp member;

an upper seal ring having a third flat surface received in said upper groove engaging in sealing contact with said boss and in sealing contact with said upper clamp cut-out of said upper clamp member;

a lower seal ring having a fourth flat surface received in said lower groove engaging in sealing contact with said boss and in sealing contact with said lower clamp cut-out of said lower clamp member;

wherein said upper corner of said protruding shoulder of said ring joint gasket and said upper clamp cut-out of said upper clamp member form a metal-to-metal seal;

wherein said lower corner of said protruding shoulder of said ring joint gasket and said lower clamp cut-out of said lower clamp member form a metal-to-metal seal; and wherein said first flat surface of said upper groove is radially wider than said third flat surface of said upper seal ring; and said second flat surface of said lower groove is radially wider than said fourth flat surface of said lower seal ring.

* * * * *